United States Patent [19]
Taylor

[11] Patent Number: 6,024,528
[45] Date of Patent: Feb. 15, 2000

[54] AMBULANCE MOUNTED STRETCHER LIFT

[76] Inventor: William L. Taylor, Highway 82 West, Eupora, Miss. 39744

[21] Appl. No.: 09/156,853

[22] Filed: Sep. 18, 1998

[51] Int. Cl.$^7$ .................................................. B60P 1/02
[52] U.S. Cl. ....................... 414/495; 414/522; 414/541; 414/921; 296/20; 296/26.09
[58] Field of Search ............................. 296/16, 19, 20, 296/26.2, 26.4, 26.8, 26.9, 26.1, 175; 414/495, 537, 540, 541, 542, 921; 5/83.1, 81.1 R

[56] References Cited

U.S. PATENT DOCUMENTS

| | | | |
|---|---|---|---|
| 2,327,680 | 8/1943 | Tavaris | 214/85 |
| 3,220,398 | 11/1965 | Carder | 254/2 |
| 3,891,108 | 6/1975 | Traficant | 214/512 |
| 4,078,269 | 3/1978 | Weipert | 5/63 |
| 4,479,753 | 10/1984 | Thorley | 414/541 |
| 4,671,730 | 6/1987 | Gateau | 414/495 |
| 4,950,123 | 8/1990 | Brockhaus | 414/522 |
| 5,244,335 | 9/1993 | Johns | 414/537 |
| 5,253,973 | 10/1993 | Fretwell | 414/558 |
| 5,331,701 | 7/1994 | Chase et al. | 14/71.1 |
| 5,346,355 | 9/1994 | Reimer | 414/542 |
| 5,556,250 | 9/1996 | Fretwell et al. | 414/558 |
| 5,651,657 | 7/1997 | Poindexter | 414/541 |
| 5,803,523 | 9/1998 | Clark et al. | 296/26.1 |
| 5,820,190 | 10/1998 | Benner | 296/26.09 |

FOREIGN PATENT DOCUMENTS

| | | | |
|---|---|---|---|
| 1500327 | 11/1967 | France | 414/495 |
| 0003484 | 5/1988 | WIPO | 414/921 |

*Primary Examiner*—D. Glenn Dayoan
*Assistant Examiner*—Paul Chenevert
*Attorney, Agent, or Firm*—Alan Ruderman; Miller & Martin LLP

[57] ABSTRACT

Stretcher supporting and lifting apparatus normally stowed beneath the body of an ambulance has a frame in the form of a plurality of telescoping members fastened to and extendable lengthwise relative to the chassis of the vehicle and carries a lifting device on which a platform is mounted. The frame may be extended and tilted downwardly from a stowed position to the ground with the platform in its lowest position. The platform has guide tracks for the wheels of a transportable stretcher and the stretcher may be rolled onto the tracks and a patient supporting litter lowered onto the platform. The lifting device is then actuated to lift the platform and the stretcher to the desired height so that the wheels may roll onto the floor of the ambulance. After the stretcher has been moved thereon, the lifting device is lowered to lower the platform, and the frame may be tilted back to the horizontal position and retracted to its stowed position beneath the ambulance.

19 Claims, 5 Drawing Sheets

AMBULANCE MOUNTED STRETCHER LIFT

BACKGROUND OF THE INVENTION

This invention relates to a stretcher lifting device which may be mounted on the frame beneath the body of an ambulance and may the extended and tilted to receive the stretcher or patient transporter and thereafter raised for transferring the stretcher/transporter into the body of the ambulance.

Emergency medical technicians who respond to medical emergencies in ambulances and similar medical emergency vehicles must on occasion transfer large patients from a stretcher, litter or mobile transporter (all of which are hereinafter referred to as "stretcher") into the vehicle. If the technicians are small, or if one or more may be a woman, or other persons of relatively slight frame and structure, and the patient is a large person, the technicians may find it difficult if not impossible to lift the stretcher into the ambulance without further injury to the patient or injury to the medical technicians. Other problems in this regard are discussed in DiMucci U.S. Pat. No. 5,495,914.

Although this difficulty may be significant, even critical, especially where time is of the essence, the prior art has not addressed the problem adequately. For example, Eelman et al., U.S. Pat. No. 5,135,350 discloses a carrier for an ambulance litter for transporting a patient between the ambulance and a gurney; DiMucci et al. '914 discloses a powered patient transporter while Lim U.S. Pat. No. 2,470,314 and Stasinos U.S. Pat. No. 2,643,395 disclose emergency stretchers retractably mounted in the trunk of a car. Werpert U.S. Pat. No. 4,078,269 and Black et al. U.S. Pat. No. 4,541,134 each relate to litter frames mounted in an ambulance, both being directed to vibration dampening/cushioning of the stretcher and patient during transport. Layer U.S. Pat. No. 3,831,996 relates to a stretcher support for an ambulance moveable from the horizontal rest position to an extended inclined position permitting easy mounting and removal of a stretcher from the frame.

Somewhat analogous to the problem of lifting and transferring patients into and out of ambulances is that of lifting and lowering a disabled person on a wheelchair between a vehicle and a floor or ground. The lift being raised from a stowed position beneath the vehicle to a raised position next to the vehicle after a lift frame is pulled manually transversely from beneath the vehicle and thereafter lowered. The lift may again be raised to permit the wheelchair to be rolled into the vehicle and the lift returned to its stowed position. For example, Svenson U.S. Pat. No. 4,941,797 discloses a lifting arrangement for use by individuals in wheelchairs for moving laterally between the inside and outside of a van, the apparatus including a platform having a scissors mechanism attached thereto and two frame members extendable from beneath the chassis of the vehicle. However, a stretcher being elongated and entering into the vehicle in the direction of elongation of the vehicle requires substantial structural differences so that extension and retraction of the stretcher support from beneath the ambulance is provided, and additionally for permitting the rolling of the stretcher onto the ambulance floor.

BRIEF SUMMARY OF THE INVENTION

Consequently, is it a primary object of the present invention to provide an apparatus that may be stowed under an ambulance and attached to the frame thereof and selectively extended to a position for receiving a stretcher and thereafter lifting the stretcher to a position where it may rolled into the body of the ambulance.

It is another object of the present invention to provide an apparatus which mounts in a stowed position under the body of an ambulance which may be extended from its stowed position, tilted to ground level to receive a mobile stretcher readily and thereafter raised to a height so that the stretcher may be rolled into the body of the ambulance.

It is a further object of the present invention to provide an apparatus having a subframe mounted beneath the body of an ambulance having extendable and tiltable rails so that the subframe may be extended from beneath the vehicle, the subframe carrying a scissors lift including a platform onto which a mobile transportable stretcher may be rolled, and thereafter lifted so that the stretcher may be rolled into the body of the ambulance.

Accordingly, the present invention provides an apparatus normally stowed beneath the body of an ambulance, the apparatus having a frame fastened to and extendable lengthwise relative to the chassis of the vehicle and carrying a lifting device on which a platform is mounted. The frame may be extended and tilted downwardly to the ground with the platform in its lowest position. The platform has guide tracks for the wheels of the transportable stretcher and the stretcher may be rolled onto the tracks. The lifting device is then actuated to lift the platform and the stretcher to the desired height so that the wheels may roll onto the floor of the ambulance. After the stretcher has been moved thereon, the lifting device is lowered to lower the platform, and the frame is tilted back to the horizontal position and retracted to its stowed position.

The frame is constructed so that the platform may be extendable lengthwise a sufficient distance to be available for receiving the stretcher yet may be retracted to beneath the vehicle. To this end, there are a pair of guide tubes with a slide member within each tube, a first of the guide tubes being secured to the slide member of the other tube and moveable relative to the other tube while the slide member associated with the first guide tube carries the lifting platform. Each slide member may be retracted fully within the respective guide tube, each guide tube being slotted in the direction of elongation to provide guideways for permitting the slide members to extend the required amount.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Referring to the drawings, the stretcher lifting apparatus 10 of the present invention includes a subframe best illustrated generally at 12 in FIG. 2, the subframe being fastened to the chassis of an ambulance 14 as hereinafter described. The frame 12 comprises two longitudinally extending pairs of telescoping tube sets on each side of the frame. Each outboard tube set includes an outer tube 16, 18 and a respective inner tube 20, 22 telescopically and slidably receivable within the corresponding outer tube, the inner tubes preferably being solid rather than hollow members. Secured by bolts to a rail 26 of the ambulance frame or chassis adjacent the front of the tubes 16, 18, is a respective mounting bracket 24, the front being considered relative to that of the ambulance 14. Welded to the brackets 24 and extending outwardly is a plate 28 which slopes downwardly and at its outer end has a hollow cylindrical boss 30, only one of which is illustrated, welded to it. The front ends of the tubes 16, 18 are secured to a narrow plate 32 which at the front ends where they respectively attach to tubes 16, 18, carry another hollow cylindrical boss 34, only one of which is illustrated. The bosses 30 and 34 at each side of the vehicle are aligned and receive respective journal pins 36 so that the tubes 16, 18 may pivot relative to the vehicle frame.

Welded to the tubes 16, 18 adjacent the lower ends is a respective angle bracket 38. A small lug 40 is welded to the angle bracket 38 facing forwardly and the clevis of the free end of a piston rod 42 is pivotally connected to each lug, the piston rod extending from a respective hydraulic cylinder 44. The head end of the cylinder 44 also has a clevis 46 pivotally connected to a lug 48 welded to a bracket 50, the bracket 50 being welded to the frame of the ambulance, such as the rail 26.

The inboard facing sides of each of the tubes 16, 18 has an elongated slot 52 which extends from the front end of the tube a substantial distance along the tube which may be approximately 70 percent for reasons which will be understood. Adjacent and disposed inboard of each outboard tube set is a respective inboard tube set respectively comprising an outer tube 54, 56 and a respective inner tube 58, 60 telescopically and slidably receivable therein. Each outer tube 54, 56 has an elongated slot 62 on the inboard side extending from the rear end of the respective tube toward the front a substantial distance substantially similar to the length of the slot 52 in the tubes 16, 18. The outboard side of each outer inboard tube 54,56 has a pair of laterally extending tabs 64, 66 welded to it, as best illustrated in FIG. 3, the tabs also being welded to the respective inner tube 20, 22 of the outboard sets at longitudinally spaced locations adjacent the front and rear of the tubes 54,20 and 56, 22 respectively.

Secured as by welding to the inner tubes 58, 60 of the inboard tube set at spaced locations are portions of a pair of tabs 68, 70, each tab respectively being welded to a respective plate 72, 74, thereby to provide rigidity and stabilization to the inboard set of tubes and providing a support base for the stretcher receiving and lifting apparatus illustrated generally at 76. A similar plate 78 is secured to the rear of the outer tubes 54, 56 of the inboard set so that the outer tubes of the inboard set are stabilized and made rigid. Thus, the plates 32, 72, 74, 78 strengthen and position the tube sets and provide a rigid structure. At least the portion 80 of the tab 70 which is welded to the inner tubes 58, 60 is of a size such that it may be received within the respective slot 62, the innertubes being telescopically received within the outertubes 54, 56 of the inboard set. In this manner, the inner tubes 58, 60 of the inboard set may slide longitudinally while supported by the plates 72,74. Additionally, the outer tubes 54, 56 of the inboard set may slide longitudinally when the inner tubes of the outer set slide within the outer tubes 16, 18 of the outboard set.

In order to slide the inner tubes 20, 22 of the outboard set and also the tubes of the inboard set there are provided two hydraulic cylinders 82, 84 which have their cylindrical bodies welded together. The free end of piston rod 84 of the hydraulic cylinder 82 has a clevis 86 connected to a block secured to the plate 32 while the free end of the piston rod 88 of the cylinder 84 has a clevis 90 connected to a block on the plate 72. A similar clevis 92 on the free end of the cylinder 84 is fastened to a block on the plate 78. Thus, when the cylinders 82, 84 are actuated, the rods 84 and 88 extend thereby driving the tubes 20, 22, 54, 56, and 58, 60 in the longitudinal direction of the ambulance. The structure thus provides three stages of movement, i.e., the outer tubes of the inboard set move while the cylinder 82 is actuated and move the inner tubes 20, 22 of the outboard set relative to the outer tubes 16, 18, while the innertubes of the inboard set move relative to the outertubes of the inboard set when the cylinder 84 is actuated. Thus, the inner tubes 58, 60 may be moved a distance substantially greater than if there were only one pair of such tube sets.

Figure 4:
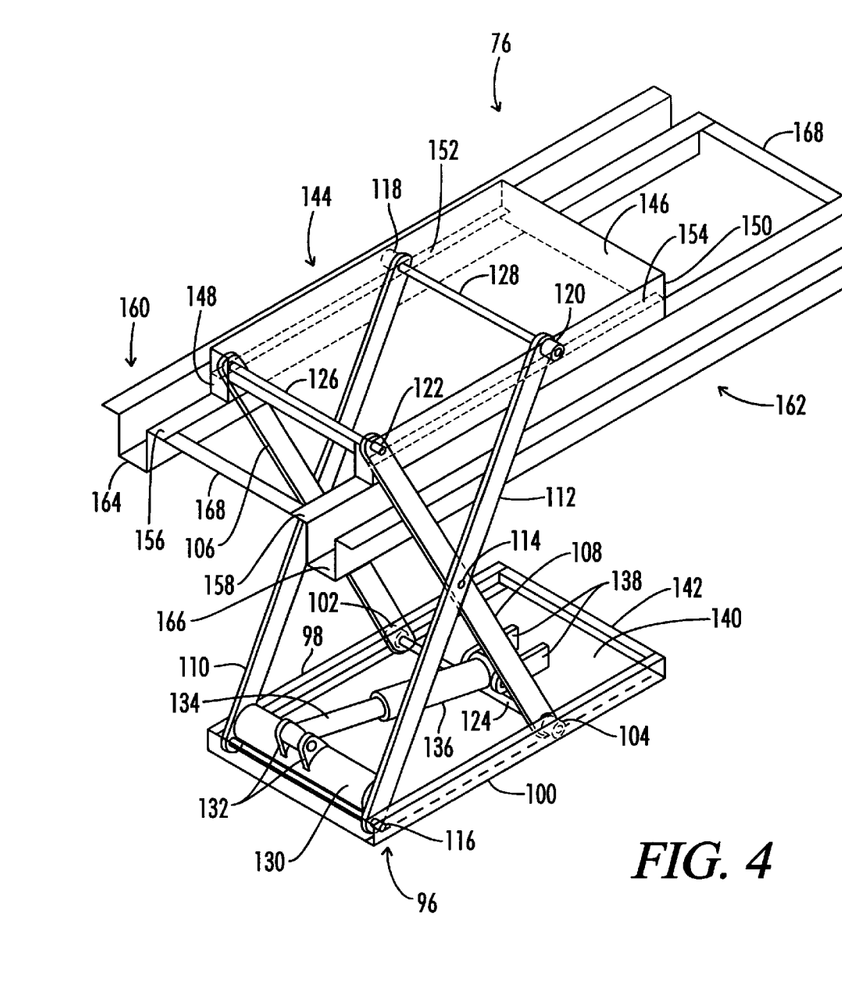
FIG. 4 illustrates the stretcher receiving and lifting platform of the apparatus illustrated in FIG. 1.

The stretcher receiving and lifting apparatus 76, which is best illustrated in FIG. 4, is carried on the plates 72, 74 and may be mounted on support blocks 94 welded to the plates 72, 74 and to the frame 96 forming the base of the lifting structure. The frame 96 is substantially a rectangular member having at least opposite longitudinally extending laterally spaced apart sides 98, 100 in the form of a U-shaped configuration with the legs of each side extending in the direction toward the other side and with the webs thereof substantially vertical. The bottom legs thereby provide respective tracks along which a respective roller 102, 104 is constrained to ride. Each roller 102, 104 is pivotally journaled at one end of a respective link 106, 108 of a pair of scissors mechanisms, the other links 110, 112 being connected respectively to the links 106, 108 by journal pins 114, only one of which is illustrated.

One end of each link 110, 112 is pivotally connected to the webs of the respective U-shaped side 98, 100 by a respective pivot pin 116, only one of which is illustrated, the other ends carrying a respective laterally extending roller 118, 120. In like manner, the ends of the links 106, 108 remote from the ends carrying the rollers 102, 104 carry pins 122, only one of which is illustrated. The end of the links 106, 108 at the track in the frame 96 are stabilized by a rod 124 extending intermediate the links. Likewise the ends of the links 106, 108 and 110,112 remote from the frame 96 are stabilized by rods 126 and 128, while the ends of the links 110, 112 adjacent the ends of the frame 96 are secured to a cylindrical member 130 extending intermediate the links. The cylinder 130 has a pair of lugs 132 between which the rod end of a piston 134 of a hydraulic cylinder 136 is journaled. The head end of the hydraulic cylinder being journaled between another pair of lugs 138 welded to a plate 140 extending between the sides 98, 100 adjacent the front wall 142 of the frame.

A stretcher receiving platform 144 having a top surface 146 and a pair of downwardly extending beams 148, 150, are supported at the ends of the links 106, 108 and 110, 112 having the pins 122 and the rollers 118, 120 respectively, the pins 122 being journaled in the beams 148, 150 while the rollers 118, 120 roll within elongated tracks 152, 154 formed on the beams 148, 150 within the interior thereof Thus, when the hydraulic cylinder 136 is actuated, the links 106, 108 and 110, 112 collapse or extend as a scissors as the rollers 102, 104 and 118, 120 roll in the respective tracks to raise or lower the platform 144 relative to the frame 96.

The lower edges of the beams 148, 150 are respectively welded to a respective lateral flange 156, 158 at the end of an upstanding leg of a pair of U-shaped channel members 160, 162 having a central web 164, 166, the channel members being stabilized by braces 168 at front and rear ends. The webs 164, 166 of the channel members define tracks on which the wheels of a mobile foldable stretcher or litter may roll and the distance between the webs and the upper surface 146 of the platform 144 may be such that the stretcher may be rolled onto the tracks defined by the webs 164, 166 and then lowered onto the platform 144.

It should thus be understood that the stretcher lifting apparatus of the present invention may be stored under the ambulance and, when required for use, it may be extended by the extension/retraction cylinders 82, 84 and tilted to the ground by the tilt cylinders 44. The stretcher may then be rolled onto the tracks formed by the webs 164, 166 and the stretcher lowered onto the platform 144. The lift cylinder 136 is thereafter actuated to raise the scissors lift and the stretcher to the desired height so that it may be rolled onto the ambulance floor. Thus, the emergency medical technicians do not have to lift the stretcher at all. After the stretcher is within the ambulance, the platform 144 is lowered by the scissors cylinders 136 and the apparatus retracted and tilted up to the stored position so that it is not in the way during travel of the ambulance.

Figure 1:
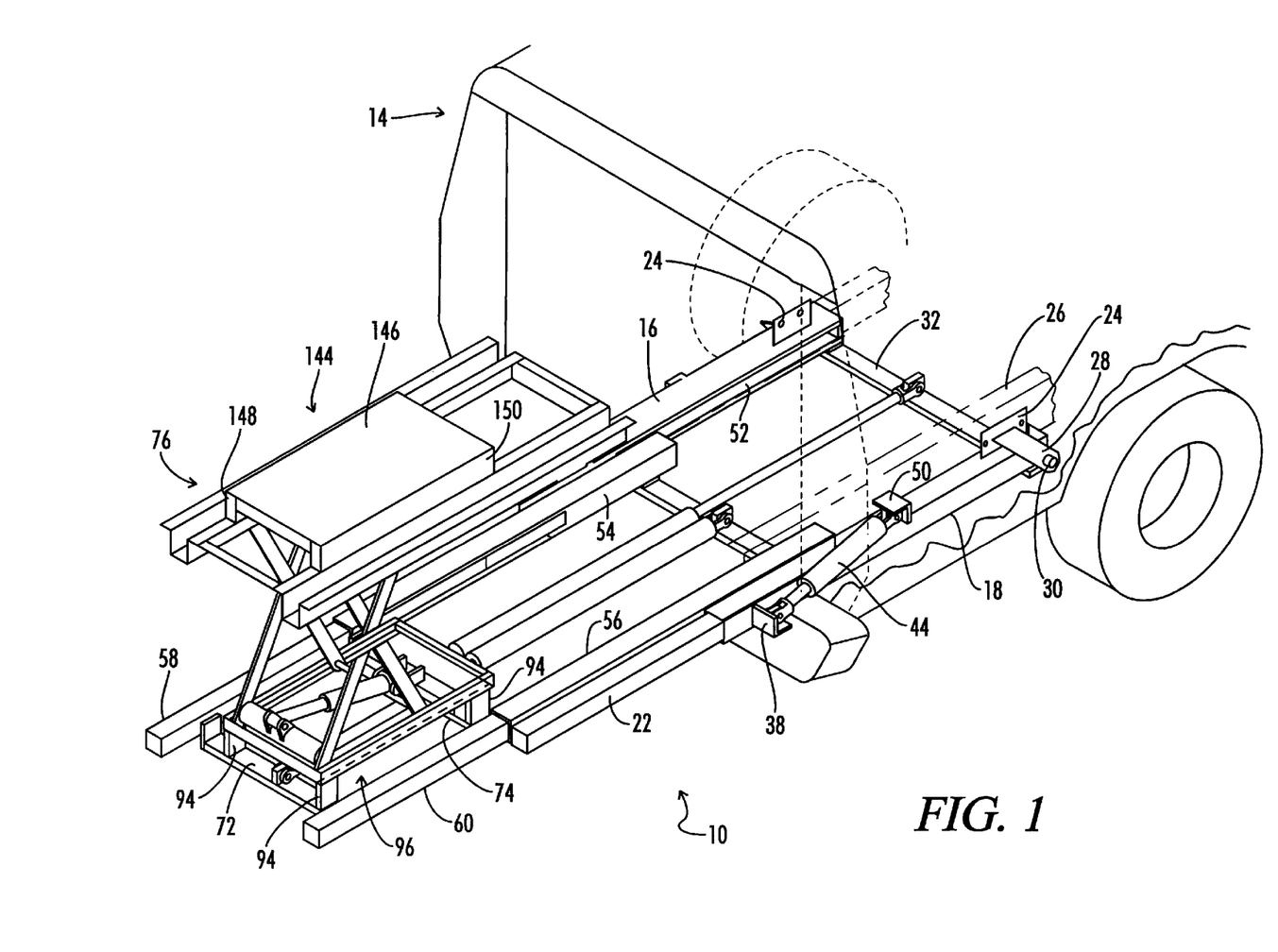
FIG. 1 is a perspective view of the stretcher lifting apparatus of the present invention with parts thereof omitted for clarity of presentation and illustrating a fragment of an ambulance with portions in phantom.
Figure 2:
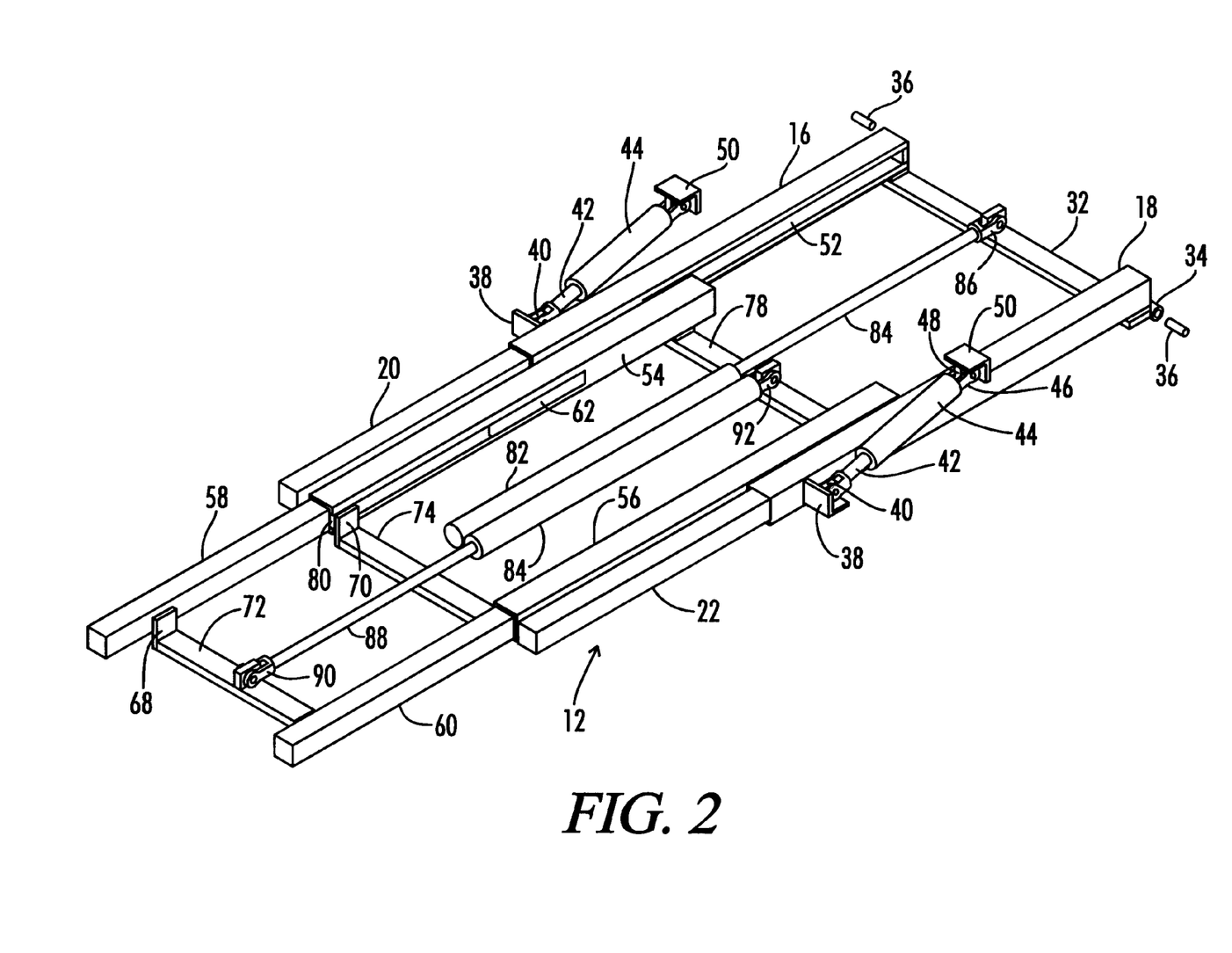
FIG. 2 is a perspective view of the subframe of the apparatus illustrated in FIG. 1.
Figure 3:
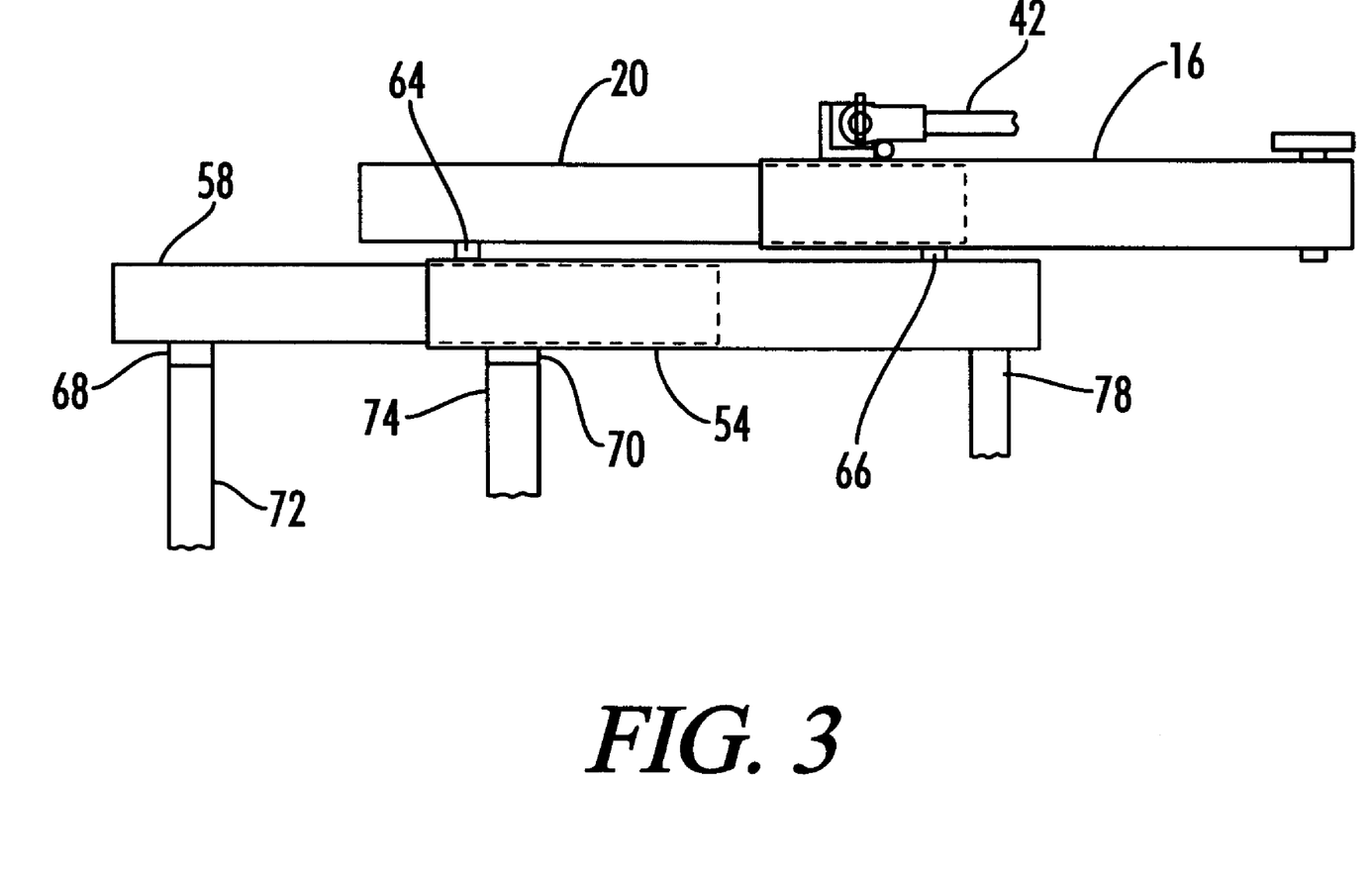
FIG. 3 is a fragmentary top plan view of a portion of the subframe illustrating FIG. 2.
Figure 5:
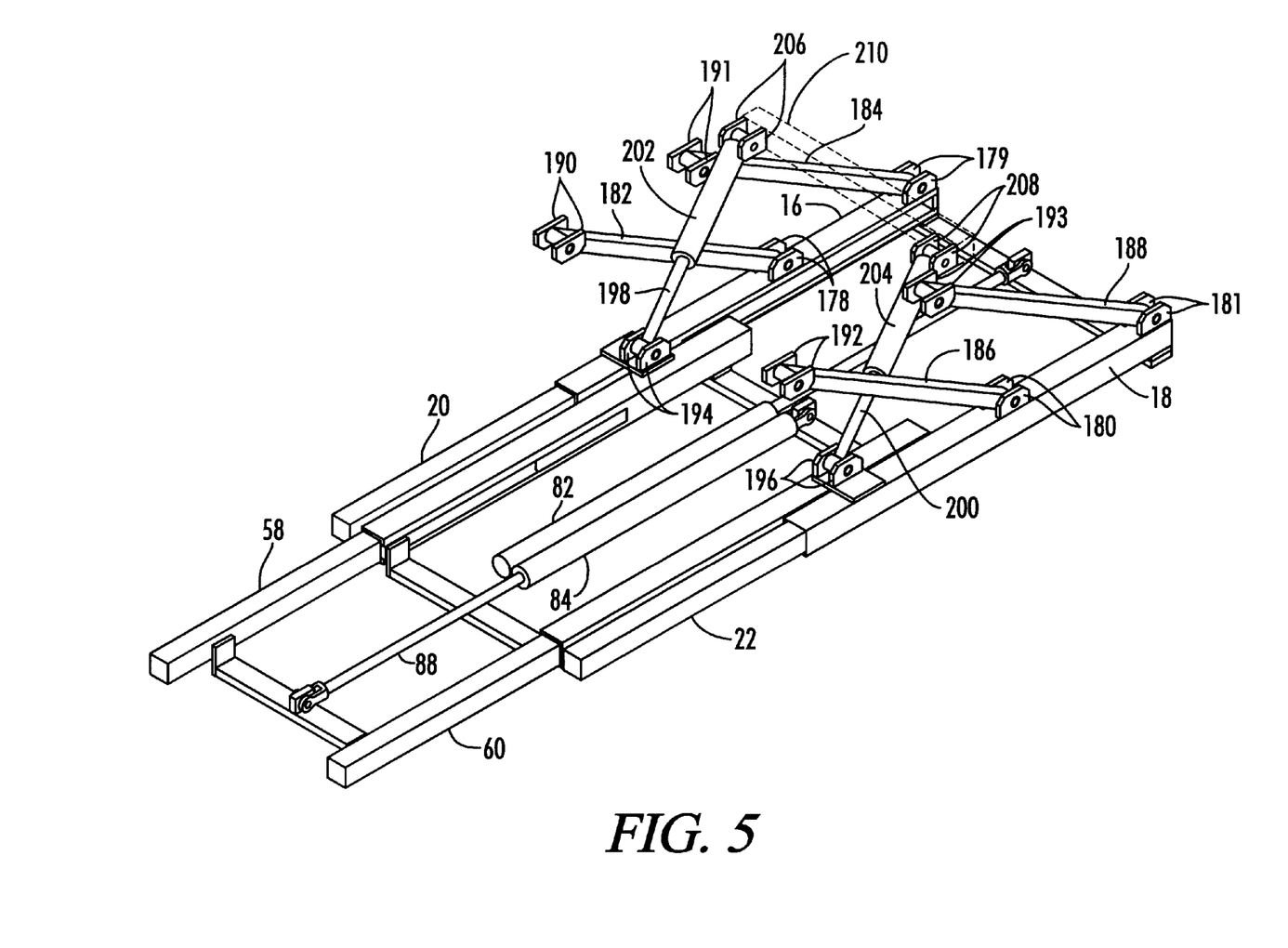
FIG. 5 is a view similar to FIG. 2 but of another embodiment.

Another manner, which may be the most preferable manner, of tilting the stretcher lifting apparatus is illustrated in FIG. 5 wherein all the structure is the same as in FIG. 2 with the exception of the tilting apparatus. Consequently, all the reference numbers which refer to the same structure remain the same. Here, rather than the tilt cylinders 44 and the structure connecting them to the stretcher lifting apparatus and to the chassis, there is provided a four-bar linkage at each side together with actuating means therefor. Thus, to each outboard outer tube 16, 18 there is welded a pair of brackets each having spaced apart pairs of lugs 178, 179 and 180, 181, each lug pair journally mounting one end of a respective link 182, 184, 186, 188. The other end of each link 182, 184, 186, 188 is journally connected to another respective lug pair 190, 191, 192, 193 which are all attached as by welding to the frame of the ambulance, such as to the rail 26 and a similar rail (not illustrated) spaced laterally from the rail 26.

Also welded to each outboard outer tube 16, 18 forward of the lug pairs 178, 180 respectively is a bracket having a lug pair 194 and 196 which respectively journally mount the free end of the piston rod 198, 200 of a hydraulics cylinder 202, 204. The head ends of the hydraulic cylinders are journally mounted to brackets carrying respective lug pairs 206, 208 which are welded to frame members of the chassis of the ambulance such as a cross member 210 which may be secured between a pair of rails such as rail 26. In this embodiment tilting of the stretcher lift frame is effected by actuation and deactuation of the cylinders 202,204 which together with the linkages 182, 184 and 186, 188 effect titling of the frame. In all other respects the operation is the same as in the embodiment of FIG. 2.

Numerous alterations of the structure herein disclosed will suggest themselves to those skilled in the art. However, it is to be understood that the present disclosure relates to the preferred embodiment of the invention which is for purposes of illustration only, and not to be construed as a limitation of the invention. All such modifications which do not depart from the spirit of the invention are intended to be included within the scope of the appended claims.

Having set forth the nature of the invention, what is claimed herein is:

1. Stretcher supporting and lifting apparatus for mounting beneath the body of an ambulance connected to a frame comprising, a first pair of laterally spaced apart sets of telescoping members, each set comprising an elongated inner member slidably receivable within an outer member and moveable relative thereto, a second pair of laterally spaced apart sets of telescoping members adjacent said first pair, each set of said second pair comprising an elongated inner member slidably receivable within an outer member and moveable relative thereto, the outer members of said second pair of sets of telescoping members being connected to and moveable with the inner members of said first pair of sets of telescoping members, said outer members of said first pair of sets of telescoping members connected to the frame of said ambulance, first power drive means for selectively extending and retracting said inner members of said first pair of sets of telescoping members relative to said outer members of said first pair of sets of telescoping members and said inner members of said second sets of telescoping members relative to said outer members of said second pair of sets of telescoping members, a stretcher receiving apparatus supported by and moveable with the inner members of said second pair of sets of telescoping members, said stretcher receiving apparatus including a base, a scissors mechanism carried by the base, a support platform carried by the scissors mechanism raised and lowered by said mechanism relative to said base, and second power drive means for raising and lowering said scissors mechanism and thereby said support platform selectively, whereby said stretcher receiving apparatus may be raised and lowered relative to said base and retracted and extended longitudinally relative to said outer members of said first pair of sets.

2. Stretcher supporting and lifting apparatus as recited in claim 1, wherein each outer member of said first pair of sets of telescoping members has an elongated slot permitting said outer members of said second pair of sets of telescoping members to move into superposed relationship with said outer members of said first pair of sets of telescoping members when said innermembers of said first pair of sets of telescoping members is received within said outer members of said first pair of sets of telescoping members.

3. Stretcher supporting and lifting apparatus as recited in claim 1, wherein each outer member of said second pair of sets of telescoping members has an elongated slot permitting said stretcher receiving apparatus to move into superposed relationship with the outer members of said second pair of sets of telescoping members when the innermembers of said second pair of sets of telescoping members is received within said outer members of said second pair of sets of telescoping members.

4. Stretcher supporting and lifting apparatus as recited in claim 3, wherein each outer member of said first pair of sets of telescoping members has an elongated slot permitting said outer members of said second pair of sets of telescoping members to move into superposed relationship with said outer members of said first pair of sets of telescoping members when said inner members of said first pair of sets of telescoping members are received within said outer members of said first pair of sets of telescoping members.

5. Stretcher supporting and lifting apparatus as recited in claim 1, wherein said support platform has a pair of laterally spaced apart sides, and a U-shaped channel member secured to each of said sides, each channel members having a central web laterally spaced from and disposed beneath said platform to define a track on which wheels of a wheel supported stretcher may roll.

6. Stretcher supporting and lifting apparatus for mounting beneath the body of an ambulance connected to a frame comprising, a first pair of laterally spaced apart sets of telescoping members, each set comprising an elongated inner members slidably receivable within an outer member and moveable relative thereto, a second pair of laterally spaced apart sets of telescoping members adjacent said first pair, each set of said second pair comprising an elongated inner member slidably receivable within an outer member and moveable relative thereto, the outer members of said second pair of sets of telescoping members being connected to and moveable with the inner members of said first pair of sets of telescoping members, said outer members of said first pair of sets of telescoping members connected to the flame of said ambulance, first power drive means for selectively extending and retracting said inner members of said first pair of sets of telescoping members relative to said outer members of said first pair of sets of telescoping members and said inner members of said second sets of telescoping members relative to said outer members of said second pair of sets of telescoping members, said first power drive means having a pair of hydraulic cylinders each having a cylindrical body and a piston rod extending therefrom, said cylindrical bodies being secured together with the piston rods extending in opposite directions, means for fastening one of said rods to said outer members of said first pair of sets of telescoping members, and means for fastening the other of said rods to a base of a stretcher receiving apparatus, whereby said base and thereby said stretcher receiving apparatus is extendable and retractable relative to said outer members of said first pair of sets of telescoping members, said stretcher receiving apparatus supported by and moveable with the inner members of said second pair of sets of telescoping members, said stretcher receiving apparatus including said base, a scissors mechanism carried by the base, a support platform carried by the scissors mechanism raised and lowered by said mechanism relative to said base, and second power drive means for raising and lowering said scissors mechanism and thereby said support platform selectively, whereby said stretcher receiving apparatus may be raised and lowered relative to said base and retracted and extended longitudinally relative to said outer members of said first pair of sets.

7. Stretcher supporting and lifting apparatus as recited in claim 6, wherein each outer member of said first pair of sets of telescoping members has an elongated slot permitting said outer members of said second pair of sets of telescoping members to move into superposed relationship with said outer members of said first pair of sets of telescoping members when said inner members of said first pair of sets of telescoping members is received within said outer members of said first pair of sets of telescoping members.

8. Stretcher supporting and lifting apparatus as recited in claim 6, wherein each outer member of said second pair of sets of telescoping members has an elongated slot permitting said stretcher receiving apparatus to move into superposed relationship with the outer members of said second pair of sets of telescoping members when the inner members of said second pair of sets of telescoping members is received within said outer members of said second pair of sets of telescoping members.

9. Stretcher supporting and lifting apparatus as recited in claim 8, wherein each outer member of said first pair of sets of telescoping members has an elongated slot permitting said outer members of said second pair of sets of telescoping members to move into superposed relationship with said outer members of said first pair of sets of telescoping members when said inner members of said first pair of sets of telescoping members is received within said outer members of said first pair of sets of telescoping members.

10. Stretcher supporting and lifting apparatus mounted beneath the body of an ambulance, said ambulance having a chassis including at least two elongated frame members beneath said body, said apparatus comprising a first pair of laterally spaced apart sets of telescoping members, each set comprising an elongated inner member slidably receivable within an outer member and moveable relative thereto, journal members for pivotally connecting said outer members of said first set of telescoping members to a respective frame member, a second pair of laterally spaced apart [sets] of telescoping members adjacent said first pair, each set of telescoping members of said second pair comprising an elongated inner member slidably receivable within an outer member an d moveable relative thereto, the outer members of said second pair of sets of telescoping members being connected to and moveable with the inner members of said first pair of sets of telescoping members, said outer members of said first pair of sets of telescoping members connected to the frame members of said ambulance, first power drive means for selectively extending and retracting said inner members of said first pair of sets of telescoping members relative to said outer members of said first pair of sets of telescoping members and said inner members of said second sets of telescoping members relative to said outer members of said second pair of sets of telescoping members, a stretcher receiving apparatus supported by and moveable with the inner members of said second pair of sets of telescoping members, said stretcher receiving apparatus including a base, a scissors mechanism carried by the base, a support platform carried by the scissors mechanism and raised and lowered by said mechanism relative to said base, and second power drive means for raising and lowering said scissors mechanism and thereby said support platform selectively, whereby said stretcher receiving apparatus may be raised and lowered relative to said base and retracted and extended longitudinally relative to said outer members of said first pair of sets.

11. Stretcher supporting and lifting apparatus as recited in claim 10, including third power drive means connected to said frame members and to said outer members of said first pair of sets of telescoping members to pivot said first and thereby said second pair of sets of telescoping members relative to said chassis so that said inner members of said second pair of sets of telescoping members may be disposed on a ground surface selectively.

12. Stretcher supporting and lifting apparatus as recited in claim 11, wherein each outer member of said first pair of sets of telescoping members has an elongated slot permitting said outer members of said second pair of sets of telescoping members to move into superposed relationship with said outer members of said first pair of sets of telescoping members when said inner members of said first pair of sets of telescoping members is received within said outer members of said first pair of sets of telescoping members.

13. Stretcher supporting and lifting apparatus as recited in claim 11, wherein each outer member of said second pair of sets of telescoping members has an elongated slot permitting said stretcher receiving apparatus to move into superposed relationship with the outer members of said second pair of sets of telescoping members when the inner members of said second pair of sets of telescoping members is received within said outer members of said second pair of sets of telescoping members.

14. Stretcher supporting and lifting apparatus as recited in claim 13, wherein each outer member of said first pair of sets of telescoping members has an elongated slot permitting said outer members of said second pair of sets of telescoping members to move into superposed relationship with said outer members of said first pair of sets of telescoping members when said inner members of said first pair of sets of telescoping members is received within said outer members of said first pair of sets of telescoping members.

15. Stretcher supporting and lifting apparatus as recited in claim 11, wherein said support platform has a pair of laterally spaced apart sides, and a U-shaped channel member secured to each of said sides, each channel members having a central web laterally spaced from and disposed beneath said platform to define a track on which wheels of a wheel supported stretcher may roll.

16. Stretcher supporting and lifting apparatus mounted beneath the body of an ambulance, said ambulance having a chassis including at least two elongated frame members beneath said body, said apparatus comprising a first pair of laterally spaced apart sets of telescoping members, each set comprising an elongated inner member slidably receivable within an outer member and moveable relative thereto, journal members for pivotally connecting said outer members of said first set of telescoping members to a respective frame member, a second said of laterally spaced apart sets of telescoping members adjacent said first pair, each set of telescoping members of said second pair comprising an elongated inner member slidably receivable within an outer member and moveable relative thereto, the outer members of said second pair of sets of telescoping members being connected to and moveable with the inner members of said first pair of sets of telescoping members, said outer members of said first pair of sets of telescoping members connected to the frame members of said ambulance, first power drive means for selectively extending and retracting said inner members of said first pair of sets of telescoping members relative to said outer members of said first pair of sets of telescoping members and said inner members of said second sets of telescoping members relative to said outer members of said second pair of sets of telescoping members, said first power drive means having a pair of hydraulic cylinders each having a cylindrical body and a piston rod extending therefrom, said cylindrical bodies being secured together with the piston rods extending in opposite directions, means for fastening one of said rods to said outer members of said first pair of sets of telescoping members, and means for fastening the other end of said rods to a base of a stretcher receiving apparatus, whereby said base and thereby said stretcher receiving apparatus is extendable and retractable relative to said outer members of said first pair of sets of telescoping members, said stretcher receiving apparatus supported by and moveable with the inner members of said second pair of sets of telescoping members, said stretcher receiving apparatus including said base, a scissors mechanism carried by the base, a support platform carried by the scissors mechanism and raised and lowered by said mechanism relative to said base, and second power drive means for raising and lowering said scissors mechanism and thereby said support platform selectively, whereby said stretcher receiving apparatus may be raised and lowered relative to said base and retracted and extended longitudinally relative to said outer members of said first pair of sets; and a third power drive means connected to said frame members and to said outer members of said first pair of sets of telescoping members to pivot said first and thereby said second pair of sets of telescoping members relative to said chassis so that said inner members of said second pair of sets of telescoping members may be disposed on a ground surface selectively.

17. Stretcher supporting and lifting apparatus as recited in claim 15, wherein each outer member of said first pair of sets of telescoping members has an elongated slot permitting said outer members of said second pair of sets of telescoping members to move into superposed relationship with said outer members of said first pair of sets of telescoping members when said inner members of said first pair of sets of telescoping members is received within said outer members of said first pair of sets of telescoping members.

18. Stretcher supporting and lifting apparatus as recited in claim 17, wherein each outer member of said second pair of sets of telescoping members has an elongated slot permitting said stretcher receiving apparatus to move into superposed relationship with the outer members of said second pair of sets of telescoping members when the inner members of said second pair of sets of telescoping members is received within said outer members of said second pair of sets of telescoping members.

19. Stretcher supporting and lifting apparatus mounted beneath the body of an ambulance, said ambulance having a chassis including at least two elongated frame members beneath said body, said apparatus comprising a first pair of laterally spaced apart sets of telescoping members, each set comprising an elongated inner member slidably receivable within an outer member and moveable relative thereto, journal members for pivotally connecting said outer members of said first set of telescoping members to a respective frame member, a second pair of laterally spaced apart sets of telescoping members adjacent said first pair, each set of telescoping members of said second pair comprising an elongated inner member slidably receivable within an outer member and moveable relative thereto, the outer members of said second pair of sets of telescoping member being connected to and moveable with the inner members of said first pair of sets of telescoping members, said outer members of said first pair of sets of telescoping members connected to the frame members of said ambulance, first power drive means for selectively extending and retracting said inner members of said first pair of sets of telescoping members relative to said outer members of said first pair of sets of telescoping members and said inner members of said second sets of telescoping members relative to said outer members of said second pair of sets of telescoping members, said first power drive means having a pair of hydraulic cylinders each having a cylindrical body and a piston rod extending therefrom, said cylindrical bodies being secured together with the piston rods extending in opposite directions, means for fastening one of said rods to said outer members of said first pair of sets of telescoping members, and means for fastening the other end of said rods to a base of a stretcher receiving apparatus, whereby said base and thereby said stretcher receiving apparatus is extendable and retractable relative to said outer members of said first pair of sets of telescoping members, said stretcher receiving apparatus supported by and moveable with the inner members of said second pair of sets of telescoping members, said stretcher receiving apparatus including said base, a scissors mechanism carried by the base, a support platform carried by the scissors mechanism and raised and lowered by said mechanism relative to said base, said support platform having a pair of laterally spaced apart sides, and a U-shaped channel member secured to each of said sides, each channel members having a central web laterally spaced from and disposed beneath said platform to define a track on which wheels of a wheel supported stretcher may roll; and second power drive means for raising and lowering said scissors mechanism and thereby said support platform selectively, whereby said stretcher receiving apparatus may be raised and lowered relative to said base and retracted and extended longitudinally relative to said outer members of said first pair of sets; and a third power drive means connected to said frame members and to said outer members of said first pair of sets of telescoping members to pivot said first and thereby said second pair of sets of telescoping members relative to said chassis so that said inner members of said second pair of sets of telescoping members may be disposed on a ground surface selectively; wherein each outer member of said second pair of sets of telescoping members has an elongated slot permitting said stretcher receiving apparatus to move into superposed relationship with the outer members of said second pair of sets of telescoping members is received within said outer members of said second pair of sets of telescoping members; and wherein each outer member of said first pair of sets of telescoping members has an elongated slot permitting said outer members of said second pair of sets of telescoping members to move into superposed relationship with said outer members of said first pair of sets of telescoping members when said inner members of said first pair of sets of telescoping members is received within said outer members of said first pair of sets of telescoping members.

* * * * *